Oct. 28, 1924.

A. J. LEWIS 1,513,710

SEPARABLE FASTENER

Filed Jan. 28, 1924

Inventor
Arthur J. Lewis
By Wooster & Davis
Attorneys

Patented Oct. 28, 1924.

1,513,710

UNITED STATES PATENT OFFICE.

ARTHUR J. LEWIS, OF STRATFORD, CONNECTICUT, ASSIGNOR TO THE AUTOYRE COMPANY, OF OAKVILLE, CONNECTICUT, A CORPORATION OF CONNECTICUT.

SEPARABLE FASTENER.

Application filed January 28, 1924. Serial No. 688,923.

*To all whom it may concern:*

Be it known that I, ARTHUR J. LEWIS, a citizen of the United States, residing at Stratford, county of Fairfield, State of Connecticut, have invented a new and useful Separable Fastener, of which the following is a specification.

This invention relates to separable fasteners, such as are used on gloves, cuff links, carriage and automobile curtains and the like, and has for an object to provide a fastener of this type in which the separable members will be securely locked together so that they cannot be separated by a mere strain tending to pull them apart, but may be easily separated or unlocked by manual operation of the securing element.

It is a further object of the invention to provide a fastener of this type which will be extremely simple in construction involving a minimum number of parts, which can be manufactured at low cost but which will be strong and durable and not likely to be easily broken and gotten out of order.

With these and other objects in view, I have devised the construction illustrated in the accompanying drawing forming a part of this specification, similar reference characters being employed throughout the various figures to designate corresponding elements. In this drawing, Fig. 1 is a transverse section substantially on line 1—1 of Fig. 3 showing the members secured together.

Figure 3:
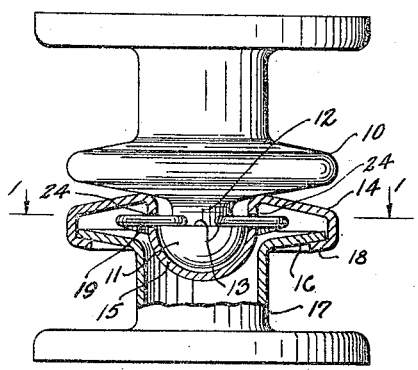
Fig. 3 is a view showing the members locked together, the stud member being in elevation and the main portion of the socket member in section, the section being taken substantially on line 3—3 of Fig. 1.

The stud member comprises a body 10 carrying the stud which has a rounded head 11 but is reduced at 12 under this head to provide a shoulder 13. This shoulder is preferably substantially flat and in a plane at right angles to the axis of the stud for a purpose to be later described. The socket member comprises a body 14 having a socket 15 extending inwardly from one side thereof, and the sides 18 of the body member in the present instance are rolled over the edges of the outwardly extending flange 16 of the member 17 to which the socket member is thereby secured. The stud is adapted to be inserted in this socket, as shown in Fig. 3.

For the purpose of securing the stud and the socket together a securing element 19 is carried by the socket member. This element is preferably a resilient wire offset at substantially its mid length to provide a projecting portion 20 extending through an opening 21 in the side of the body 14, and projecting a sufficient distance therefrom for manual operation. The sides of the wire are bent outwardly on opposite sides of this offset portion, as shown at 22, to provide stop shoulders to engage the inner wall of the body and limit the outward movement of the element. The sides of the wire are then bent inwardly toward each other, as shown at 23, and pass through openings 24 in the sides of the socket, these side portions of the wire extending across a portion of the socket at the inside thereof in alignment with the path of movement of the shoulder 13 under the head 11 of the stud. They are then curved outwardly, as shown at 25, and the free ends 26 are then extended inwardly toward each other and engage the outer walls of the socket. These free ends have a camming action on the outer walls of the socket, and because of this camming action operating through the resiliency of the wire tend to hold this securing element in the locking position shown in full lines in Fig. 1. In this position, as will be seen, the offset 20 projects outwardly through the side walls of the body, the stop shoulders 22 rest against the inner walls of the body and the side portions 23 extend across the socket on the inside thereof in the path of movement of the shoulder 13.

Figure 1:
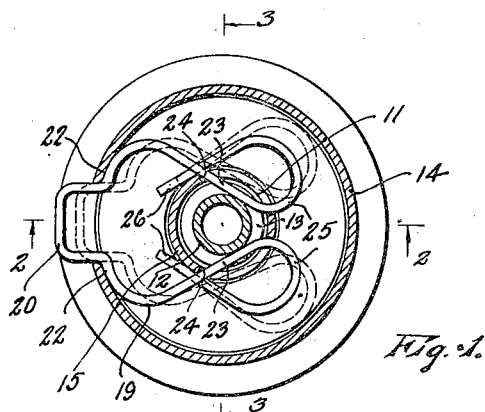
Figure 2:
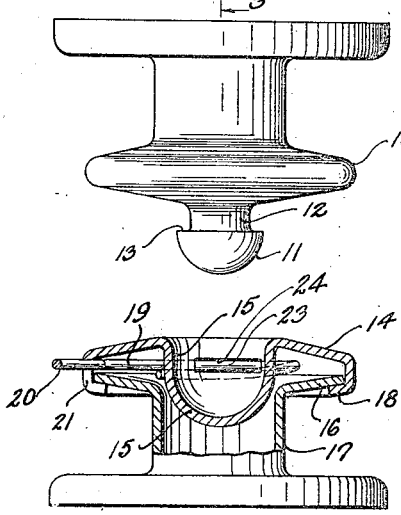
Fig. 2 is a side elevation of the stud member and a section of the main portion of the socket member showing the members in separated relation.

If now the head of the stud is forced into the socket the rounded surface of the head will press the securing sides 23 outwardly to allow the head to pass into the socket, and after the head passes the wire the resiliency of the wire, acting through the camming action of the free ends 26 on the outer wall of the socket, will return the side portions 23 to their original position, or the full line position shown in Fig. 1, and under the head so as to engage the shoulder 13 and securely lock the stud in the socket. As this shoulder is substantially flat and in a plane at substantially right angles to the axis of the stud any strain tending to separate the members will not unlock this stud. The stud may, however, be easily unlocked by merely pressing inwardly on the projecting portion 20. This action will move the securing element bodily inward or to the right, as viewed in Fig. 1, which will tend to move the securing sides 23 from engagement with the shoulder 13, and the camming action of the free ends 26 on the walls of the socket will tend to separate these side portions of the securing element and move them outwardly away from the stud. Thus there is a combined longitudinal and separating movement of the side members which quickly carries them out of alignment with the shoulder 13 to allow withdrawal of the stud from the socket. The position of the securing element when in unlocked position is shown in dotted lines in Fig. 1. The flange 16 is preferably located adjacent the securing element to prevent it springing away from the socket.

Figure 4:
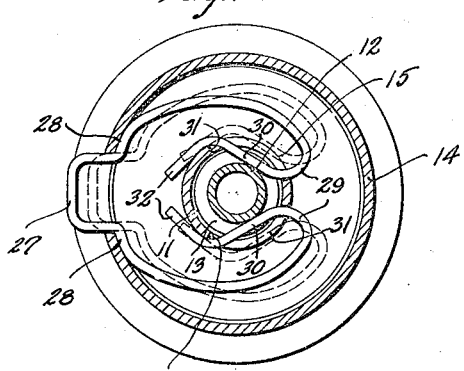
Fig. 4 is a view similar to Fig. 1 showing a slightly different construction of the securing element.

In Fig. 4 is shown a slightly different construction of the securing element. This form as in the first form, comprises a resilient wire offset intermediate its length to provide a projecting portion 27 extending through the opening 21 in the side of the body 14. The wire on opposite sides of this offset is then bent outwardly to form stops 28 engaging the inner walls of the socket member. The sides are then curved inwardly and back upon themselves, as shown at 29, to provide inclined securing portions 30 which extend through openings 31 in the sides of the socket and across the socket in the path of movement of the shoulder 13 in the stud. The free ends 32 are then inclined toward each other and engage the outer wall of the socket.

The operation of this form is the same as that of the first form. Forcing the head of the stud into the socket will cause the curved surface of this head to engage the securing portions 30 to force them outwardly and allow the head to pass. They will then move inwardly under the shoulder due to the resiliency of the wire and the camming action of the free ends 32 on the walls of the socket. This element is released the same as in the first form by pressing inwardly on the projection 27, causing the element to move bodily to the right, as viewed in Fig. 4, which tends to move the securing portions 30 from beneath the shoulder, and during this movement the camming action of the free ends 32 on the walls of the socket will tend to separate the elements the same as in the first form. The unlocked position of this element is substantially that as shown in dotted lines in Fig. 4.

It will be apparent that the fastener is very simple in construction, comprising practically but three members, one of which, the securing element, is a single piece of resilient wire which may be formed by simple bending operations. The stud is easily forced into the socket in the securing operation and will be securely locked in the socket, but it may be easily unlocked by merely pressing inwardly on the projecting portions 20 and 27.

Having thus set forth the nature of my invention, what I claim is:

1. In a separable fastener, a pair of separable members one of which has a socket and the other a headed stud adapted for insertion in said socket, and a resilient securing element extending through the side of the socket in position to engage under said head and having a portion projecting from said socket member for manual operation, said securing element also having a portion engaging the side of the socket and adapted for camming action thereon upon operation of said element to withdraw said element from beneath said head and release the stud.

2. In a separable fastener, a pair of separable members one of which has a socket and the other a stud provided with a shoulder and adapted for insertion in said socket, and a resilient securing element having portions extending through opposite sides of the socket in position to engage said shoulder and having a portion projected from one side of said socket member for manual operation of said element, said securing element being also provided with inclined portions engaging the outer walls of the socket and adapted upon operation of said element to have a camming action on said socket to remove said element from engagement with said shoulder and release the stud.

3. In a separable fastener, a pair of separable members one of which has a socket and the other a stud provided with a shoulder and adapted for insertion in said socket, and a resilient securing element extending through the side of said socket in position to engage said shoulder and having a portion projecting from said socket member for manual operation, said securing element also having a portion inclined to the direction of movement of the element and engaging the wall of the socket so that on operation of said element it will have a camming action on the socket to withdraw the element from engagement with said shoulder, said inclined portion also acting to retain the element in securing position.

4. In a separable fastener, a pair of separable members one of which has a socket and the other a stud having a rounded head adapted for insertion in said socket, and a securing element comprising a resilient wire bent intermediate its length to form a projection extending through the wall of the socket member for manual operation of said element, the opposite side portions of said wire extending through the walls of the socket to engage under said head, then inclined to engage the outer wall of said socket and adapted upon operation of said element to have camming action on said wall to withdraw said side portions from beneath said head and release the stud.

5. In a separable fastener, a pair of separable members one of which has an outer wall and a socket spaced from said wall and the other a stud having a rounded head adapted for insertion in said socket, and a securing element comprising a resilient wire bent intermediate its length to form a projection extending through the outer wall of the socket member for manual operation of said element, the sides of said wire being bent outwardly on opposite sides of said extension to provide stop shoulders to engage the inner side of the outer wall of said socket member, the sides of said wire then curving toward each other and extending through the sides of said socket to engage under said head, the free ends of said wire being inclined to engage the outer surface of the wall of the socket and adapted upon operation of said element to have a camming action on said wall and withdraw said securing portions from under said head.

6. In a separable fastener, a pair of separable members one of which has a socket and the other a stud provided with a shoulder and adapted for insertion in said socket, a securing element comprising a resilient wire bent intermediate its length to form a projection extending through the wall of the socket member for manual operation of said element, the opposite side portions of said wire extending through the walls of the socket to engage under said shoulder, and coacting cam means carried by the socket member and said element arranged to move the said side portions laterally from under said shoulder upon manual operation of said element.

In testimony whereof I affix my signature.

ARTHUR J. LEWIS.